Feb. 13, 1951  C. L. ABELE  2,541,183
FISHING REEL
Filed March 1, 1948  2 Sheets-Sheet 1
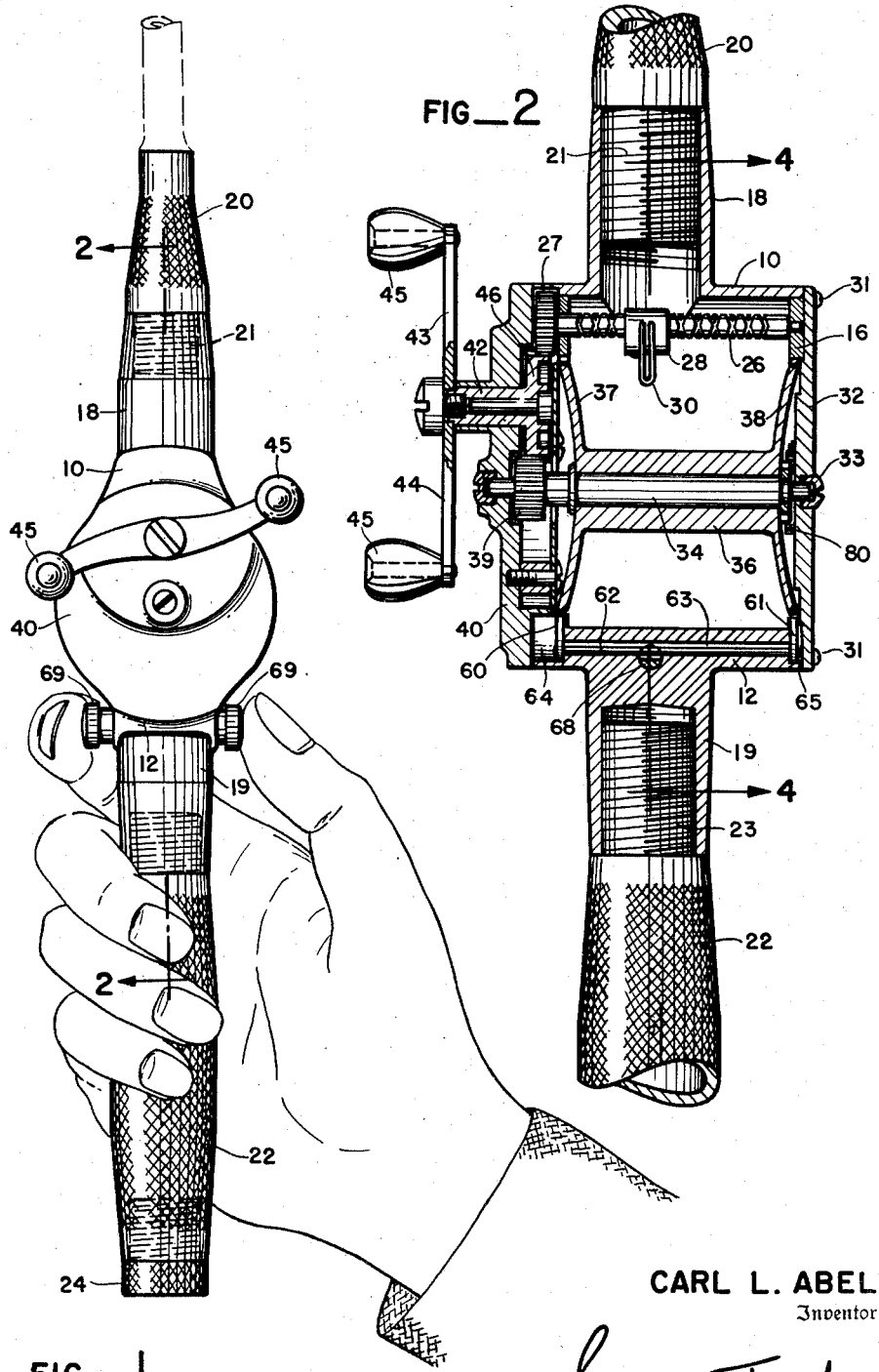
CARL L. ABELE
Inventor Feb. 13, 1951 — C. L. ABELE — 2,541,183
FISHING REEL
Filed March 1, 1948 — 2 Sheets-Sheet 2
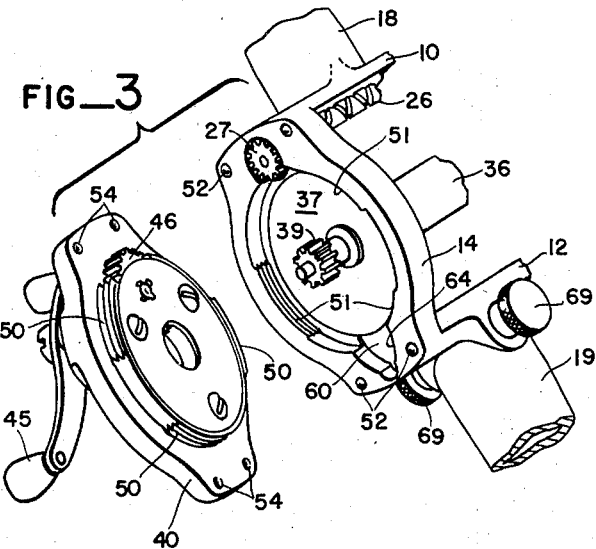
FIG_3
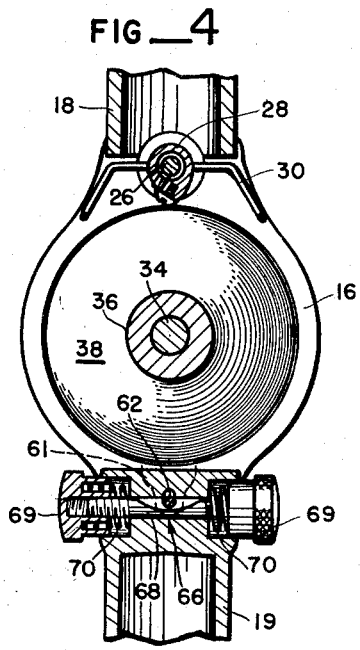
FIG_4
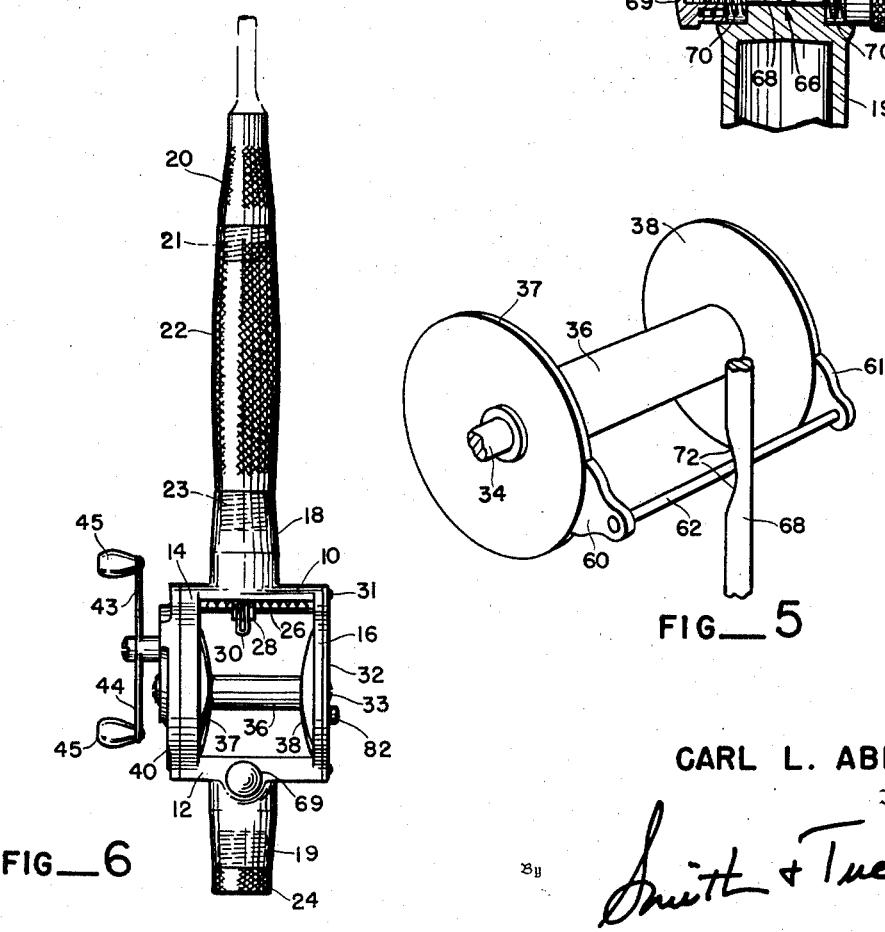
FIG_5
FIG_6
CARL L. ABELE
Inventor
By Smith + Tuck
Attorneys

UNITED STATES PATENT OFFICE 2,541,183

FISHING REEL

Carl L. Abele, Des Moines, Wash.

Application March 1, 1948, Serial No. 12,259

4 Claims. (Cl. 242—84.5)

This invention relates to fishing reels and, more particularly, to fishing reels of the type that are incorporated in a fishing rod, intermediate its ends, either above or below the handle portion by which the fisherman manipulates the rod.

It is an important object of this invention to provide a fishing reel having a peripherally braked spool which is simple and easy to construct and which may be assembled and disassembled with considerable ease and without resort to the use of tools, as far as the servicing of the major portions of the reel and brake are concerned.

Another object of the invention is to provide, in a fishing reel of the type described, a simple and efficient braking mechanism that is so located that it is readily available to the fisherman in normal casting operations and may be applied by the use of but a single hand.

A still further object of the invention lies in the provision of a braking mechanism for reels of the type described which will permit ready adjustment for the application of a great variety of braking forces upon the ferrule according to the wishes and needs of the fisherman.

Other objects and advantages of the invention will be more apparent during the course of the following specification.

The invention and its details are shown in the accompanying drawings, in which:

Fig. 1 is a view in side elevation of my fishing reel;

Fig. 2 is an enlarged view in vertical section taken on line 2—2 of Fig. 1 on the longitudinal axis thereof;

Fig. 3 is an exploded view with portions omitted for convenience of illustration showing the details of construction and elements of joinder between a cover plate and a portion of the frame;

Fig. 4 is a sectional view as though taken on the plane 4—4 of Fig. 2;

Fig. 5 is a perspective view of the spool and the braking mechanism with the frame elements omitted; and Fig. 6 is a view in elevation of my fishing reel as it appears assembled for a fly casting operation.

The main frame of my fishing reel is of openwork construction, and comprises the cross bars 10 and 12, that are positioned in opposition to each other, and whose ends are joined by loop members 14 and 16. The cross bars 10 and 12 each have a hollow internally threaded sleeve 18 and 19, respectively. In the showing in Figs. 1 and 2 a rod barrel 20, having a threaded boss 21, is engaged in the sleeve 18. A handle element 22 having a threaded boss 23 is similarly engaged in the threaded sleeve 19. The lower end of the handle member 22 is similarly threaded internally and is closed by a screw cap 24. When the device is being used for bait casting, the various elements will be assembled as shown in Figs. 1 and 2, but on the other hand, when the device is being used for fly-casting and it is preferable to have the reel below the handle, the order or arrangement of the parts is as shown in Fig. 6, with the barrel 20 joined with the handle portion 22 and the latter seated in sleeve 18, with sleeve 19 being closed by the cap screw 24.

At its end, I journal a level winder screw shaft 26 in the ring member 14 and 16 and beneath the cross bar 10. A nut 28 having line guiding loops 30 is mounted upon the screw 26 to travel back and forth along the length of said shaft when the shaft is rotated to lay the line upon the line spool in a neat and level manner. Shaft 26 has on one end the pinion gear 27.

A cover plate 32 is superimposed upon the outer face of the frame-ring 16 and provides bearings 33 for the spool shaft 34 for rotation thereof, as well as for the spool 36 having end cheeks 37 and 38, as shown in Figs. 2 and 5. Shaft 34 is provided with gear 39.

A cover plate 40 closes the opening of the frame loop 14 and provides a substantial journal for the crank shaft 42 that carries the crank arms 43 and 44, each of which has a suitable crank handle 45 to facilitate manual turning. On its inner end, shaft 42 has a gear 46 which meshes with gear 27 and 39, whereupon rotation of the gear 46 will result in rotation of both the spool 36 and the screw shaft 26, as when a fishing line is being wound upon the spool.

The cover plate 32 is secured in place by screws 31. The cover plate 40 is secured upon frame loop 14 by means of the screw elements 50 and 51, which are in effect divided threads, so that part 40 may be removed from part 14 by a turn through an arc of 60° whereupon the threads are unmeshed and disengageable as clearly shown in Fig. 3. Detents 52 and sockets 54 between elements 14 and 40 retain the latter against unwarranted rotation as when the crank shaft 42 is being turned while the reel is in use.

The braking features of my invention are clearly shown in Figs. 1, 2, 4, and 5. Brake shoes 60 and 61 are provided to bear respectively on the peripheral edges of the spool flanges 37 and 38. The shoes 60, 61 are joined by a spring rod 62, which is mounted in an elongated passage 63 running through the frame cross bar member 12, from end to end, between the cavities 64 and 65 at either end. It will be apparent that when the shoes 60 and 61 are pressed against the spool flanges 37 and 38, sufficient friction will be created to substantially retard rotation of the spool. A second passage 66 is also formed in the cross bar 12 at right angles to passage 63, and in inter-section therewith, for the reception of the brake rod 68, which is threaded at each end to receive a cap nut 69, under the head of each of which nuts is a spring 70 seated in a suitable cavity in the cross bar for that purpose.

Brake rod 68 is cut away between its ends to form a pair of camming surfaces 72, which lie closely adjacent to the braking rod 62. When the low point of the cut-away portion of rod 68 is immediately opposite spring rod 62 there will be no braking action upon the spool 36, but when rod 68 is moved, as by thumb pressure applied to either of the buttons 69, in the manner suggested in Fig. 1, one or the other of the camming surfaces 72 will contact the rod 62 and distort it slightly, applying a pressure upon the shoes 60 and 61 at its end and, consequently, a frictional contact of substantial moment is obtained upon the flanges 37 and 38 of the spool 36. It will be apparent that by screwing down either of the screws 69 the positioning of the camming surface 72 with respect to rod 62 may be varied so that a slight braking action can be had at all times, due to the balance positioning of bar 68 produced by the tendency of the two springs 70 to come to a balanced condition. In such an arrangement, pressure upon one button 69 would produce a greater braking action and pressure upon the other button 69 would remove the braking action.

The entire construction of the reel is extremely simple and an important advantage obtained by this construction is that the user may quickly take his reel apart in the event that it becomes necessary for oiling or drying or servicing the various components. The reel is broken down by first removing the cover plate 40 in the manner shown in Fig. 3 whereupon the spool 36 may be withdrawn, through the opening of loop 14, from its seat in loop 16 and the end bearing 33 of shaft 34. Such a breaking down may be had without resort to tools, since sufficient leverage may be applied manually to revolve the cover plate 40 with respect to loop 14 to disengage the threads 50 and 51.

A releasable "click" mechanism 80 of conventional form is disposed between the spool 36 and wall 32, and is externally released by manual movement of operating button 82 shown in Fig. 6.

While I have shown and described particular embodiments of my invention, it will occur to those skilled in the art that various changes and modifications may be made without departing from the true spirit and scope of my invention as set forth in the sub-joined claims.

Having thus described my invention, I claim:

1. In a fishing reel of the type wherein there is a crank-operated, double-flanged spool journalled for rotation in opposed walls of a frame that is adapted for association with a fishing rod, a braking mechanism for the spool, comprising: a shoe to frictionally engage the periphery of each flange of said spool, a spring-rod connecting said shoes and mounted in said frame for spoolward movement, said frame having a passage therethrough lateral of said spring rod and disposed to that side of said rod away from said spool, a bar slidably mounted in said passage and having opposed cam faces to contact said spring rod upon movement in either direction, said rod extending to without said frame at each end and having a button thereon, and spring means between each said button and said frame and working against each other.

2. In a fishing reel of the type wherein there is a crank-operated, double-flanged spool journalled for rotation in opposed walls of a frame that is adapted for association with a fishing rod, a braking mechanism for the spool, comprising: a shoe to frictionally engage the periphery of each flange of said spool, a spring-rod connecting said shoes and mounted in said frame for spoolward movement, said frame having a passage therethrough lateral of said spring rod and disposed to that side of said rod away from said spool, said frame being counter-bored at each terminus of said passage, a bar slidably mounted in said passage and having opposed cam faces to contact said spring rod upon movement in either direction, a spiral spring seated in each counterbored terminus of said passage and surrounding said bar, and a button secured to each end of said bar and overlying a spring therearound, said button being positioned for manual engagement.

3. In a fishing reel of the type wherein there is a crank-operated, double-flanged spool journalled for rotation in opposed walls of a frame that is adapted for association with a fishing rod, a braking mechanism for the spool, comprising: a shoe to frictionally engage the periphery of each flange of said spool, a spring-rod connecting said shoes and mounted in said frame for spoolward movement, a first cam slidably mounted in said frame closely adjacent said spring rod on the side away from said spool for movement lateral of said spring rod, a second cam coupled with said first cam in opposed relation thereto and movable therewith, and a presser member connected to each cam, each presser member having a portion extending to without said frame for manual manipulation to apply said brake shoes to said spool flanges.

4. In a fishing reel of the type wherein there is a crank-operated, double-flanged spool journalled for rotation in opposed walls of a frame that is adapted for association with a fishing rod, a braking mechanism for the spool, comprising: a shoe to frictionally engage the periphery of each flange of said spool, a spring-rod connecting said shoes and mounted in said frame for spoolward movement, a first cam slidably mounted in said frame closely adjacent said spring rod on the side away from said spool for movement lateral of said spring rod, a second cam coupled with said first cam in opposed relation thereto and movable therewith, a presser member connected to each cam, each presser member having a portion extending to without said frame for manual manipulation to apply said brake shoes to said spool flanges, and opposed bias means associated with each of said cams for maintaining the same out of contact with said spring rod.

CARL L. ABELE.

REFERENCES CITED

The following references are of record in the file of this patent:

UNITED STATES PATENTS

| Number | Name | Date |
|---|---|---|
| 422,786 | Holzmann | Mar. 4, 1890 |
| 1,204,856 | From | Nov. 14, 1916 |
| 1,544,128 | Budd et al. | June 30, 1925 |
| 1,572,104 | Budd | Feb. 9, 1926 |
| 1,648,824 | Fife | Nov. 8, 1927 |
| 2,190,984 | Gulbrandsen | Feb. 20, 1940 |